(12) United States Patent
Wend et al.

(10) Patent No.: US 11,072,466 B2
(45) Date of Patent: Jul. 27, 2021

(54) CARRYING DEVICE FOR RECEIVING GOODS

(71) Applicant: Dürkopp Fördertechnik GmbH, Bielefeld (DE)

(72) Inventors: Michael Wend, Bielefeld (DE); Thomas Johannesmann, Bielefeld (DE)

(73) Assignee: Dürkopp Fördertechnik GmbH, Bielefeld (DE)

( * ) Notice: Subject to any disclaimer, the term of this patent is extended or adjusted under 35 U.S.C. 154(b) by 260 days.

(21) Appl. No.: 16/265,160

(22) Filed: Feb. 1, 2019

(65) Prior Publication Data
US 2019/0241321 A1 Aug. 8, 2019

(30) Foreign Application Priority Data
Feb. 5, 2018 (DE) ...................... 10 2018 201 676.3

(51) Int. Cl.
| | |
|---|---|
| *B65D 33/16* | (2006.01) |
| *B65G 19/02* | (2006.01) |
| *B65G 47/38* | (2006.01) |
| *B65G 9/00* | (2006.01) |
| *B65D 33/14* | (2006.01) |

(52) U.S. Cl.
CPC ......... *B65D 33/1658* (2013.01); *B65D 33/14* (2013.01); *B65G 9/002* (2013.01); *B65G 19/025* (2013.01); *B65G 47/38* (2013.01); *B65G 2201/0261* (2013.01)

(58) Field of Classification Search
CPC .. B65D 33/1658; B65D 33/14; B65G 19/025; B65G 47/38; B65G 9/002; B65G 2201/0261
See application file for complete search history.

(56) References Cited

U.S. PATENT DOCUMENTS

| | | | |
|---|---|---|---|
| 3,464,733 A | 9/1969 | Shaw | |
| 3,757,985 A * | 9/1973 | Clarke | ................... A01D 46/22 294/68.24 |
| 9,630,751 B1 * | 4/2017 | Otto | ....................... B65D 88/52 |

(Continued)

FOREIGN PATENT DOCUMENTS

| | | |
|---|---|---|
| DE | 81 33 433 U1 | 3/1982 |
| DE | 32 06 829 A1 | 9/1983 |

(Continued)

*Primary Examiner* — Stephen A Vu
(74) *Attorney, Agent, or Firm* — McGlew and Tuttle, P.C.

(57) ABSTRACT

A carrying device for receiving goods, including a carrying wall which has a front wall and a rear wall, is arrangeable between a closed state and an open state, at least partially forwardly, downwardly and rearwardly delimits a carrying volume for receiving the goods in the closed state, and downwardly opens up the carrying volume in the open state. The carrying device includes a closing device for releasably connecting the front wall to the rear wall in the closed state and an actuating device, connected to the closing device, for releasing the connection between the front wall and the rear wall from the closed state, having an actuating structure arranged at a spacing from the closing device and a transmission structure acting between the actuating device and the closing device. The transmission structure is formed in a flexible manner.

20 Claims, 11 Drawing Sheets

(56) References Cited

U.S. PATENT DOCUMENTS

| | | | | |
|---|---|---|---|---|
| 10,370,179 B2* | 8/2019 | Schneuing | ............ | B65G 47/38 |
| 2012/0216971 A1* | 8/2012 | Trolin | ...................... | D21C 7/00 |
| | | | | 162/17 |
| 2018/0312341 A1* | 11/2018 | Keller | .................. | B65G 19/025 |

FOREIGN PATENT DOCUMENTS

| | | |
|---|---|---|
| EP | 1 199 002 A1 | 4/2002 |
| EP | 2 130 968 A1 | 12/2009 |
| WO | 2017/178 225 A1 | 10/2017 |

* cited by examiner

CARRYING DEVICE FOR RECEIVING GOODS

CROSS-REFERENCE TO RELATED APPLICATIONS

This application claims the priority of German Patent Application, Serial No. DE 10 2018 201 676.3 filed on Feb. 5, 2018, pursuant to 35 U.S.C. 119(a)-(d), the content of which is incorporated herein by reference in its entirety as if fully set forth herein.

FIELD OF THE INVENTION

The invention relates to a carrying device for receiving goods.

BACKGROUND OF THE INVENTION

EP 2 130 968 A1 discloses a carrying device having a carrying wall with a rigid front wall and a flexible rear wall, and a closing device for connecting the front wall to the rear wall in a releasable manner. In order to release the connection between the front wall and the rear wall, the carrying device has an actuating device with an actuating means arranged at a spacing from the closing device and a transmission means acting between the actuating means and the closing device. The transmission means is arranged on a front side of the front wall and configured as a rigid connecting rod. In order to ensure that the transmission means moves smoothly even when the carrying device is loaded with goods, the front wall is configured in a rigid manner. As a result of the rigid configuration of the front wall, the latter is particularly heavy and the maximum bearing load, available for transporting the goods, of the carrying device is reduced. Moreover, as a result of the limited flexibility of the front wall, adaptation to the individual geometry of the goods is not possible, with the result that these are not enclosed sufficiently tightly and can fall out of the carrying device on account of transport-related vibrations and starting accelerations.

SUMMARY OF THE INVENTION

The invention is based on the object of improving a carrying device for receiving goods such that it has an increased load-bearing capacity and is particularly robust in operation, wherein the goods are retained captively in the carrying device.

This object is achieved by a carrying device for receiving goods, comprising a carrying wall which has a front wall and a rear wall, is arrangeable between a closed state and an open state, delimits a carrying volume for receiving the goods to the front, to the bottom and to the rear at least partially in the closed state (20), and downwardly opens up the carrying volume in the open state, a closing device for releasably connecting the front wall to the rear wall in the closed state and an actuating device, connected to the closing device, for releasing the connection between the front wall and the rear wall from the closed state, having an actuating means arranged at a spacing from the closing device and a transmission means acting between the actuating device and the closing device, wherein the transmission means is formed in a flexible manner. The essence of the invention is that the carrying device has the actuating device with the flexible transmission means acting between the actuating means and the closing device. The carrying device is preferably a transport bag. The actuating device is in this case configured to release the connection between the front wall and the rear wall from the closed state and the actuating means is arranged at a spacing from the closing device.

The transmission means establishes a force-transmitting connection between the actuating means and the closing device. As a result of the flexible configuration of the transmission means, the shape of the latter can be adapted in a manner corresponding to the goods held in the carrying device. A rigid configuration of the front wall and/or a load-bearing configuration of the transmission means can be avoided, with the result that these can be configured particularly with a reduced weight. The maximum permissible bearing load can thus be increased. The flexible transmission means also ensures that the actuating device is configured in a robust manner and that the goods are carried captively.

Preferably, the carrying wall has at least one side wall for at least partially laterally delimiting the carrying volume. The carrying wall can have for example two side walls on the two sides of the carrying device. The at least one side wall can be attached to the front wall and/or to the rear wall. The goods can thus be retained captively in the carrying volume.

Preferably, the closing device is attached to the front wall and/or to the rear wall in a form-fitting and/or force-fitting and/or materially bonded manner, in particular as a separate component. The closing device can be releasably connected to the front wall and/or the rear wall. According to one aspect of the invention, the closing device has at least one rigid closing element cooperating, in particular by contact, with the front wall and/or the rear wall. As a result of the rigid configuration of the closing element, a particularly reliable and robust connection between the front wall and the rear wall is achieved.

The at least one side wall can have a folding. The folding is directed preferably inwardly, in the direction of the carrying volume. A spacing between the front wall and the rear wall is thus variable. The carrying device can thus be folded up very flat. When the carrying device is filled with goods, the at least one side wall can unfold, with the result that the carrying volume is adaptable in a particularly flexible manner to the particular geometry of the goods.

The at least one side wall can be configured in a rigid manner. The at least one side wall can have rigid side-wall members that are connected together in an articulated manner.

The carrying device can have an inner bag. The inner bag can be arranged between the front wall and the rear wall. Preferably, the inner bag is attached to the front wall and/or to the rear wall. The inner bag can delimit the carrying volume at least partially to the sides and/or to the front and/or to the rear. The inner bag is preferably configured such that it delimits the carrying volume downwardly in the closed state and opens it up downwardly in the open state. The inner bag ensures that the carrying volume is delimited at least partially laterally and that the goods are released from the carrying volume particularly reliably when the carrying device is moved from the closed state into the open state.

The transmission means extends preferably over at least 20%, in particular at least 30%, in particular at least 50%, in particular at least 75%, in particular at least 100%, of the height of the carrying wall in the closed state. Advantageously, this has the result that the actuating means can be arranged in an upper region of the carrying device, in which region the carrying device is mounted in a particularly stable manner, wherein the closing device can be arranged at a lower end of the carrying device to release the goods in a gravity-based manner.

A carrying device configured such that the transmission means is formed in a pliable manner ensures that the goods are retained reliably in the carrying volume and ensures a reduced-weight configuration of the actuating device. The pliable configuration of the transmission means is understood as meaning that the transmission means is bendable reversibly, that is to say without damage to the transmission means, in particular without an elastic limit of the transmission means being exceeded, about an axis, in particular an axis oriented perpendicularly to a longitudinal extent of the transmission means. Preferably, the transmission means is configured in at least one subregion such that the curvature thereof is reversibly variable by at least $0.01$ $mm^{-1}$, in particular at least $0.02$ $mm^{-1}$, in particular at least $0.04$ $mm^{-1}$ The transmission means thus exhibits particularly high flexibility and is adaptable particularly readily to the individual geometry of the goods. As a result of the pliable configuration of the transmission means, the absorption of transverse forces is largely prevented, with the result that the transmission means can be embodied in a particularly lightweight manner.

According to one aspect of the invention, the transmission means is reversibly extensible along its longitudinal extent. A carrying device of this type ensures that the goods are retained captively in the carrying volume and ensures a reduced-weight configuration of the actuating device. The transmission means can have transmission segments that are mounted in a displaceable manner with respect to one another and/or be configured in a stretchable manner. This allows the spacing spanned by the transmission means between the closing device and the actuating means to be varied. In this case, the transmission means can be arranged to the side of the carrying wall. A change in shape of the carrying wall on account of the goods introduced into the carrying volume is not impeded by the transmission means, with the result that the goods can be enclosed particularly securely and tightly. The forces acting on the transmission means are also low, with the result that the latter can be configured in a lightweight manner and is particularly robust in operation.

Preferably, the transmission segments are mounted so as to be displaceable along the longitudinal extent with respect to one another. The transmission means can be configured in the form of a telescopic rod. However, the stretchable configuration of the transmission means is understood as meaning that the extent of the transmission means, in particular along the longitudinal extent of the transmission means, is reversibly stretchable, in particular without being damaged, in particular within an elastic limit of the transmission means. Preferably, the longitudinal extent of the transmission means is at least sectionally variable by at least 2%, in particular at least 5%, in particular at least 10%, in particular at least 20%, in particular at least 50%, in particular at least 100%.

A carrying device configured such that the transmission means has a Bowden cable and/or a hydraulic line is particularly robust in operation and reliably ensures the release of the connection between the front wall and the rear wall. Preferably, the transmission means is configured to transmit mechanical forces. Since the transmission means has a Bowden cable and/or a hydraulic line, the mechanical forces can be transmitted between the actuating device and the closing device with particularly low friction and thus efficiently. The Bowden cable and/or the hydraulic line can be configured in a pliable manner. The Bowden cable and/or the hydraulic line allow particularly large changes in curvature.

According to one aspect of the invention, the carrying wall is configured at least regionally in a flexible manner. A carrying device of this type ensures the reduced-weight configuration of the carrying device and ensures that the goods are retained captively in the carrying volume. As a result of the at least regionally flexible configuration of the carrying wall, in particular of the front wall and/or of the rear wall, the goods can be enclosed particularly tightly by the carrying wall. The carrying wall can be configured, in particular on account of the pliable configuration, in a particularly thin-walled and thus lightweight manner. Preferably, the carrying wall consists at least regionally of a textile material. The carrying wall is configured preferably in a stretch-resistant and/or pliable manner.

A carrying device configured such that the transmission means is arranged at least sectionally in front of the front wall, wherein the front wall is formed at least regionally in a flexible manner, ensures that the carrying device is mounted in a robust manner along a rail system. Preferably, the transmission means is arranged entirely in front of the front wall or behind the rear wall. As a result of the transmission means being arranged at least sectionally in front of the front wall, lateral protrusion of the transmission means can be avoided and the carrying device can be moved reliably along the rail system without catching. As a result of the flexible configuration of the transmission means and the at least partially flexible configuration of the front wall, the latter can deform together with the transmission means in a manner corresponding to the dimensions of the goods, with the result that the goods can be retained captively in the carrying volume.

Preferably, the front wall and/or the rear wall has at least one guide loop for guiding the transmission means. The transmission means can extend through the at least one guide loop. This can ensure that the transmission means bears closely against the front wall and/or the rear wall. Catching of the transmission means is thus prevented and the handling of the carrying device is improved.

Preferably, the at least one guide loop is attached to a lateral edge of the front wall and/or of the rear wall. The at least one guide loop can be at a spacing of at most 50 mm, in particular at most 30 mm, in particular at most 20 mm, from the lateral edge of the front wall and/or of the rear wall. Preferably, the at least one guide loop is oriented vertically. The at least one guide loop can also be attached to an upper and/or a lower edge of the front wall and/or of the rear wall. Preferably, the at least one guide loop arranged on the upper and/or the lower edge is oriented horizontally.

A carrying device configured such that the closing device has a front closing strip and a rear closing strip, wherein the front closing strip and the rear closing strip are fastened together in a releasable manner to connect the front wall to the rear wall in the closed state, ensures a secure connection of the front wall to the rear wall. Preferably, the front closing strip and/or the rear closing strip are configured in a rigid manner. The front closing strip and/or the rear closing strip can have a longitudinal extent which corresponds to at least 50%, in particular at least 75%, in particular at least 100%, of the longitudinal extent of the carrying wall. The connection between the front wall and/or the rear wall is thus particularly firm and robust.

Preferably, the front closing strip and/or the rear closing strip project on at least one side beyond an extent of the carrying wall along a longitudinal axis of the carrying device. The connection of the front closing strip to the rear closing strip can be arranged outside the lateral boundary of the carrying wall along the longitudinal axis. The goods can thus be released from the carrying volume particularly reliably and without being impeded by the released connection.

A carrying device configured such that the front closing strip is attached to the front wall and such that the rear closing strip is attached to the rear wall ensures that the goods are held captively in the carrying volume.

Preferably, an underside of the front wall is connected to the front closing strip and/or an underside of the rear wall is connected to the rear closing strip. Preferably, the front wall, in particular in the open state, is attached to the front closing strip along the entire extent of its underside. Preferably, the rear wall, in particular in the open state, is attached to the rear closing strip along the entire extent of its underside. As a result, the goods can be retained particularly reliably in the carrying volume in the closed state.

The front wall can have a front closing-strip loop for fastening the front closing strip to the front wall. The rear wall can have a rear closing-strip loop for fastening the rear closing strip to the rear wall. Preferably, the front closing-strip loop is connected to the front closing strip via a loop connecting means. The rear closing-strip loop can be connected to the rear closing strip via a loop connecting means. The loop connecting means can be configured as a force-fitting connection, in particular as a screw connection and/or as a clamped connection, and/or as a form-fitting connection, in particular as a riveted connection and/or as a securing pin, and/or as a materially bonded connection, in particular as an adhesive bond and/or weld. Preferably this has the result that the front closing strip and/or the rear closing strip is secured against falling out of the front closing-strip loop and/or the rear closing-strip loop.

A carrying device configured such that in order to be moved out of the closed state, the front closing strip and the rear closing strip are mounted against one another so as to be displaceable obliquely with respect to a longitudinal axis of the carrying device ensures that the closing device is opened reliably from the closed state into the open state. The displaceable mounting of the front closing strip relative to the rear closing strip and obliquely to the longitudinal axis ensures that the movement of the carrying wall into the open state is supported by the dead weight of the goods.

Preferably, the displaceable mounting of the front closing strip relative to the rear closing strip is configured perpendicularly to the longitudinal axis. The front closing strip and the rear closing strip can be mounted against one another in a linearly displaceable manner in order to be moved out of the closed state. The closing device can have a guide means for moving the front closing strip in a guided manner relative to the rear closing strip. The guide means can have a tongue and groove connection. The closing device is thus opened in a particularly robust manner and the goods are released reliably.

A carrying device configured such that the closing device has a spring means, acting between the front closing strip and the rear closing strip, for supporting the movement from the closed state into the open state reliably ensures the releasing of the connection between the front wall and the rear wall out of the closed state and thus ensures that the goods are released from the carrying volume. The spring means can be configured as a spiral spring, in particular as a compression spring and/or as a tension spring and/or as a torsion spring, and/or as a leaf spring and/or as a rubber-elastic element. Preferably, the spring means is arranged between the front closing strip and the rear closing strip such that it is tensioned in the closed state and relaxed in the open state. Advantageously, this has the effect that the movement of the closing device from the closed state into the open state is supported by the spring means. The goods are thus released particularly reliably from the carrying volume.

A carrying device configured such that the closing device has a centring means for moving the front closing strip into the closed state in a guided manner relative to the rear closing strip ensures that the closing device is moved reliably from the open state into the closed state. Preferably, the centring means is configured as an elevation, in particular as a centring pin and/or as a centring rib. The centring means can be attached to the front closing strip and/or to the rear closing strip. Preferably, the centring means cooperates with a recess, in particular a centring bore and/or a centring slot. The recess can be attached to the front closing strip and/or to the rear closing strip. The front closing strip and the rear closing strip can thus be moved from the open state into the closed state particularly securely and robustly, in particular in an automatable manner.

A carrying device configured such that the closing device has at least one locking bolt that is mounted so as to be rotatable about a bolt axis ensures that the front wall is securely connected to the rear wall in the closed state. The closing device can also have more than one, in particular at least two, in particular at least three, locking bolts. Preferably, at least two of the locking bolts are movable, in particular displaceable and/or rotatable, relative to one another. The locking bolts can be mounted in a rotatable manner about two bolt axes that are arranged at a spacing from one another. The rotatable mounting of the locking bolt is particularly low-friction and robust. The at least one locking bolt engages preferably in at least one bolt engagement means in the closed state. The at least one locking bolt can have a bolt pin for reversibly engaging in the at least one bolt engagement means. For example, the locking bolt can be attached to the front closing strip and the bolt engagement means to the rear closing strip. Alternatively, the locking bolt can also be attached to the rear closing strip and the bolt engagement means to the front closing strip.

The rear closing strip and/or the front closing strip can have a thickness in a range from 5 mm to 40 mm, in particular in a range from 10 mm to 30 mm, in particular in a range from 20 mm to 25 mm. Preferably, the bolt engagement means does not project beyond the front closing strip and/or the rear closing strip in the closed state.

Preferably, the bolt engagement means is arranged in the region of the centring means. The centring means can be formed by the bolt engagement means. Preferably, the locking bolt forms, together with the at least one bolt engagement means, a form-fitting connection. As a result of the form-fitting connection, the front wall can be connected to the rear wall particularly reliably.

The closing device and/or the actuating device can have at least one closing spring for exerting a closing-spring force on the locking bolt. The closing spring is configured preferably such that the closing-spring force causes the locking bolt to move into the closed state. The locking bolt is thus retained securely in the closed state and undesired releasing of the closing device is reliably prevented. The closing spring can be configured as a tension spring and/or as a compression spring and/or as a torsion spring. The at least one closing spring can be attached to the transmission means. Alternatively or additionally, the at least one closing spring can be attached to the at least one locking bolt.

Preferably, the at least one closing spring acts between the at least one locking bolt and the front closing strip and/or the rear closing strip.

A carrying device configured such that the closing device has at least two of the locking bolts, which are movable relative to one another, is particularly robust in operation and ensures that the front wall is connected to the rear wall in a particularly reliable manner in the closed state. The at least two locking bolts can be movable in translation and/or rotation relative to one another. The at least two locking bolts can be arranged on the front closing strip and/or on the rear closing strip. Preferably, the at least two locking bolts are arranged on the same closing strip. The at least two locking bolts are displaceable and/or rotatable preferably in opposite directions to one another in order to move from a closed position into an open position. According to a further aspect of the invention, the at least two locking bolts can be configured such that they come into engagement successively with the respective bolt engagement means. A force required for closing the closing device can thus be particularly small.

According to one aspect of the invention, the at least two locking bolts are movable independently of one another by means of the actuating means. To this end, the locking bolts can be operatively connected to a respective transmission means.

A carrying device configured such that the closing device has a coupling unit, acting between the at least two locking bolts, for the kinematic coupling of a movement of the at least two locking bolts is particularly easy to handle and robust in operation. Preferably, the coupling unit connects the at least two locking bolts such that the at least two locking bolts are movable out of the closed position into the open position by a single transmission means. Since the carrying device has to have only one transmission means, the latter is particularly easy to handle and economical to produce.

According to one aspect of the invention, the coupling unit is configured such that, between the locking bolts, only forces for moving the respective locking bolt from the closed position into the open position can be transmitted, but not forces for moving from the open position into the closed position.

The coupling unit can have a deflection means. Preferably, the transmission means acts on the at least two locking bolts via the deflection means. The deflection means is mounted preferably in a rotatable manner. The deflection means can be connected in a form-fitting manner to at least one of the locking bolts. To this end, the deflection means can have an actuating pin. The actuating pin can engage in an actuating cutout in the locking bolt.

The coupling unit can have a cable pull. Preferably, at least one of the locking bolts is operatively connected to the deflection means via the cable pull. Preferably, the cable pull is configured only to transmit tractive forces, but not compressive forces. The actuating cutout can be in the form of a groove. Advantageously, this has the result that the transmission means can effect only opening of the at least two locking bolts. The locking bolts are not locked in the closing position by the transmission means. The locking bolts can be moved from the closed position into the open position. The locking bolts can thus be connected to the respective bolt engagement means particularly smoothly. The locking bolts can form a latching connection with the respective bolt engagement means.

A carrying device configured such that the closing device has at least two bolt engagement means for the engagement of the locking bolt in the closed state ensures a particularly secure connection of the front wall to the rear wall in the closed state. Preferably, the at least two bolt engagement means are arranged at a spacing from one another along the longitudinal axis. The at least two bolt engagement means can be arranged entirely outside a lateral boundary of the carrying wall as seen in plan view.

The at least two bolt engagement means have preferably at least one closing bevel. The closing bevel can be configured such that, when the closing device is moved from the open state into the closed state, it transmits a moment to the locking bolt. The at least one closing bevel can allow the locking bolt to latch into the closed state from the open state, in particular without the actuating device being actuated.

A carrying device configured such that the at least two bolt engagement means are arranged in a manner offset through at least 120° with respect to one another relative to the bolt axis ensures the secure connection between the front wall and the rear wall in the closed state. As a result of the arrangement, offset through at least 120°, in particular at least 140°, in particular at least 160°, in particular 180°, of the at least two bolt engagement means with respect to one another relative to the bolt axis, the front wall can be fastened to the rear wall particularly robustly and without play.

A carrying device configured such that a suspension device, attached to the carrying wall, for suspending the carrying device, wherein the actuating means is attached to the suspension device ensures reliable movement of the carrying device from the closed state into the open state. The suspension device is configured preferably to fasten the carrying device to a rolling adapter of a rail system. The suspension device can have a transport hook for connecting to the rolling adapter. The actuating means can be arranged beneath a hook engagement means, at which the transport hook comes into contact with the rolling adapter. Preferably, the actuating means is arranged in the region of a straight line which extends through the hook engagement means and a centre of gravity of the carrying device. A spacing between the hook engagement means and the actuating means is preferably at most 200 mm, in particular at most 150 mm, in particular at most 100 mm, in particular at most 50 mm, in particular at most 25 mm. This ensures that the carrying device is deflected at most slightly out of its stable position when the actuating means is triggered. The actuating means can thus be triggered particularly reliably.

The actuating means is preferably configured as an actuating lever and mounted so as to be rotatable about a lever axis, which is in particular parallel to the longitudinal axis. The actuating means can be configured such that it is able to be triggered by means of an actuating force acting in a horizontal direction, in particular counter to a transport direction of the carrying device. The actuating means can thus be actuated reliably, in particular in an automatable manner.

Further advantageous configurations, additional features and details of the invention can be gathered from the following description of a number of exemplary embodiments with reference to the figures.

DESCRIPTION OF THE PREFERRED EMBODIMENTS

Figure 1:
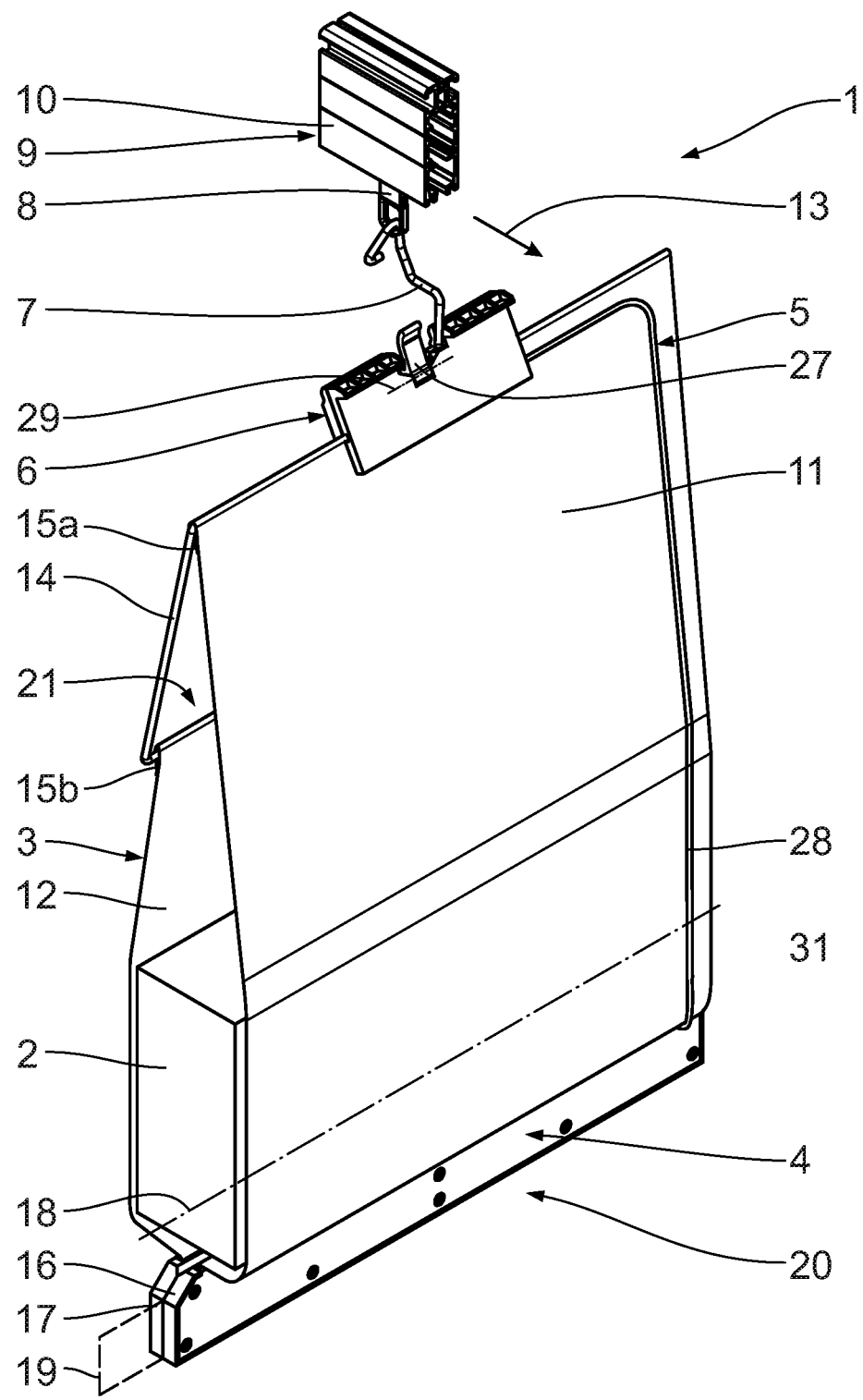
FIG. 1 shows a perspective illustration of a carrying device in a closed state obliquely from the front, with a carrying wall, a closing device and an actuating device.
Figure 2:
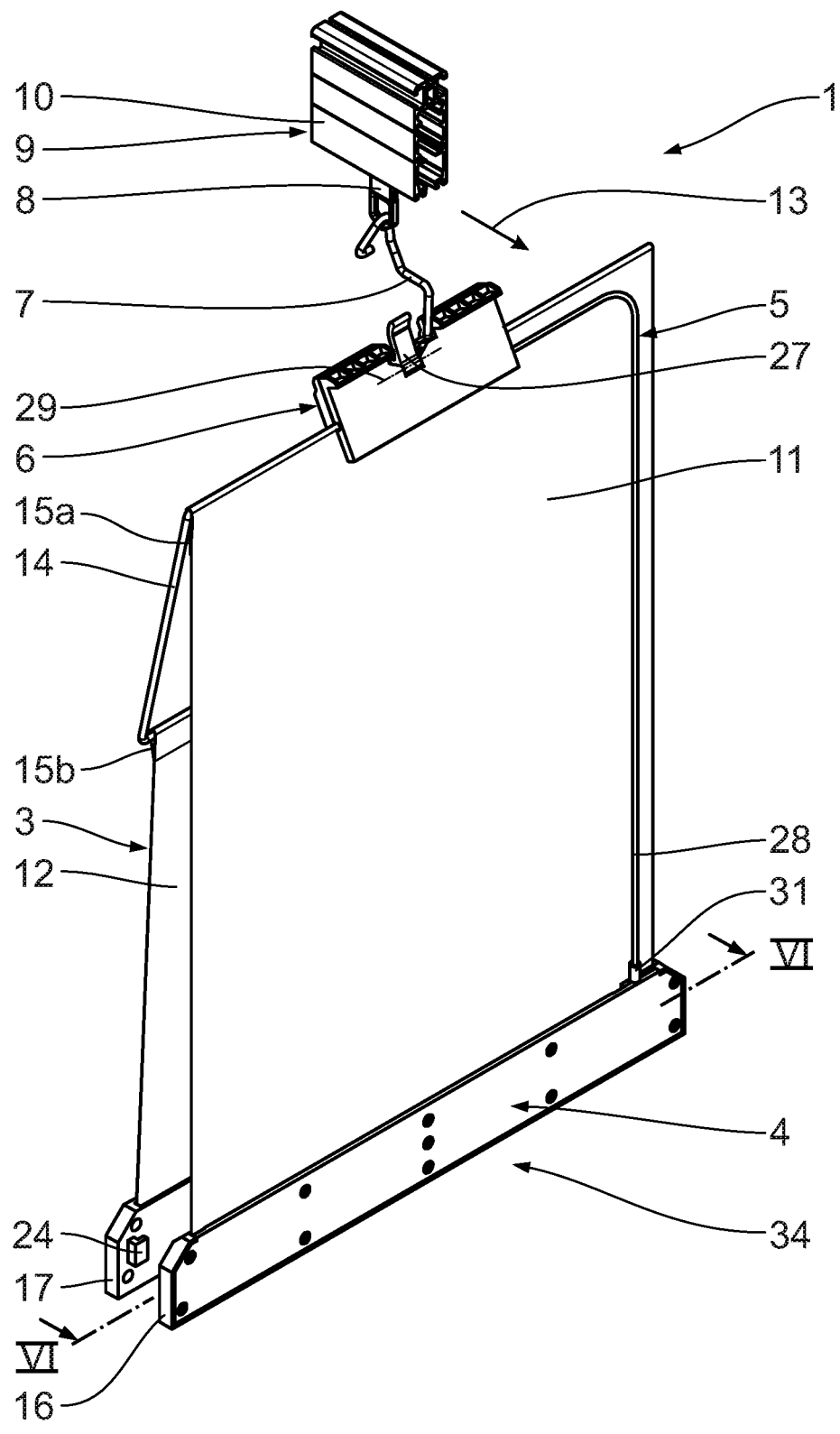
FIG. 2 shows a perspective illustration of the carrying device in FIG. 1 in an open state.
Figure 3:
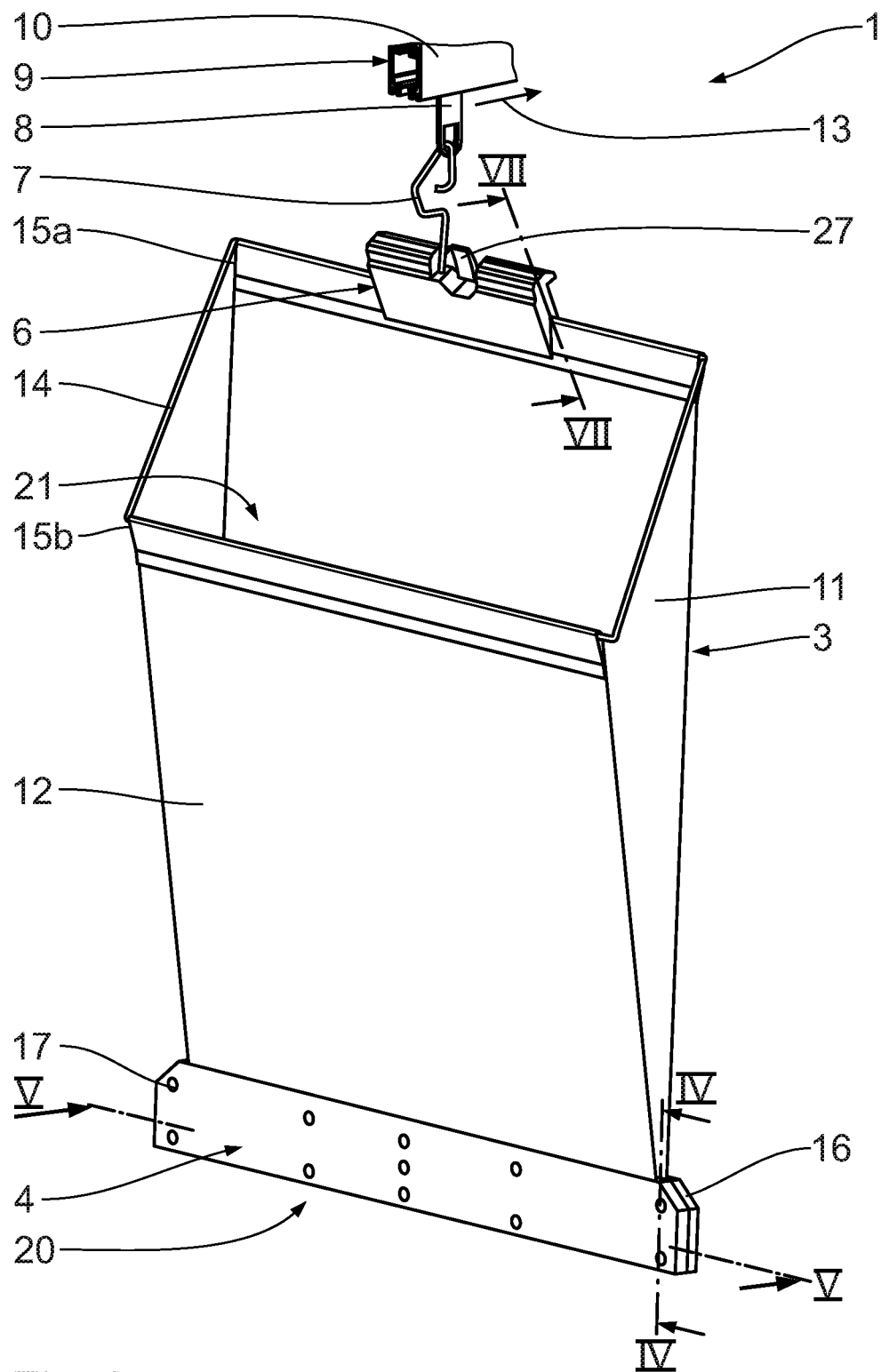
FIG. 3 shows a perspective illustration of the carrying device in FIG. 1 obliquely from the rear.
Figure 4:
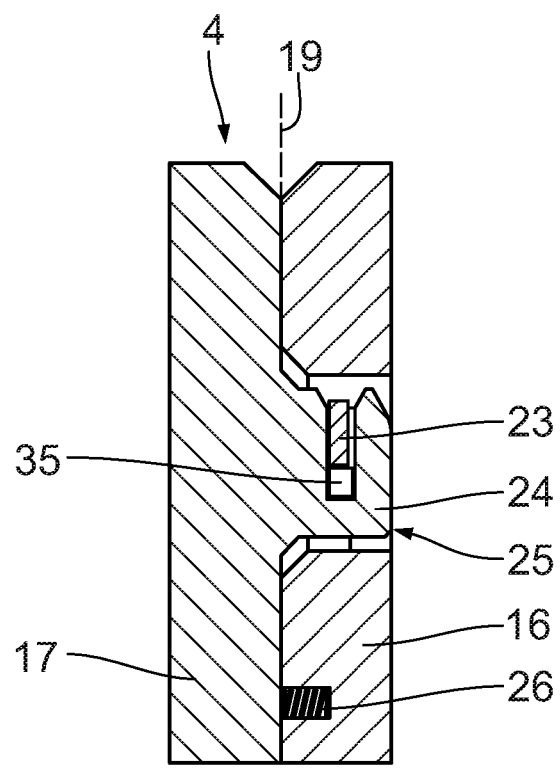
FIG. 4 shows a sectional illustration of the closing device along a section line IV-IV in FIG. 3.
Figure 5:
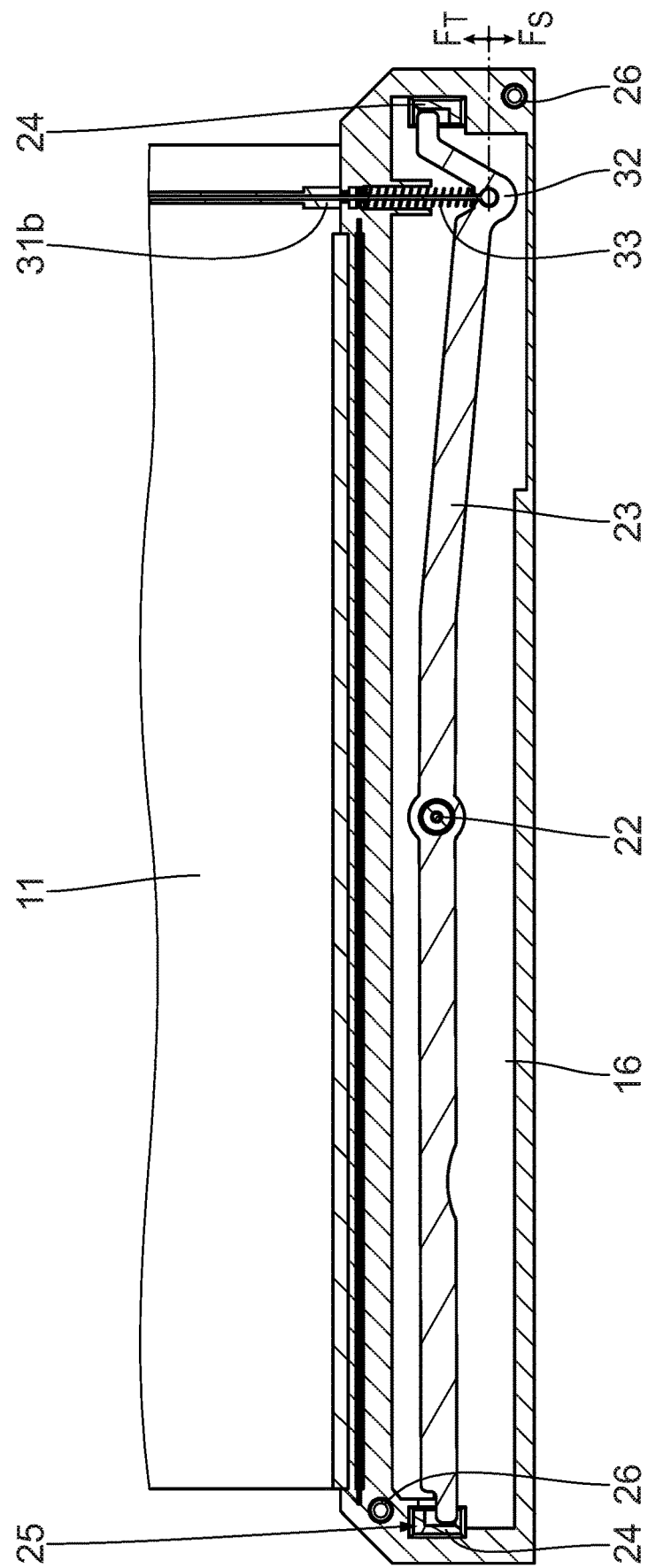
FIG. 5 shows a sectional illustration of the carrying device along a section line V-V in FIG. 3.

In the following text, an exemplary embodiment of a carrying device 1 for receiving goods 2 is described with reference to FIG. 1 to FIG. 7. The carrying device 1 has a carrying wall 3, a closing device 4, an actuating device 5 and a suspension device 6.

The suspension device 6 is attached to the carrying wall 3. The suspension device 6 comprises a transport hook 7 for fastening the carrying device 1 to a rolling adapter 8 of a rail system 9. The rolling adapter 8 is mounted in a linearly displaceable manner in a guide profile 10 of the rail system 9. By means of a rail drive (not illustrated), the rolling adapter 8 can be moved along the guide profile 10 in an automated manner together with the carrying device 1 attached thereto. The carrying wall 3 has a front wall 11 and a rear wall 12. The front wall 11 is arranged on the carrying device 1 at the front in a transport direction 13 and the rear wall 12 is arranged on the carrying device 1 at the rear in the transport direction 13. The front wall 11 is attached to the suspension device 6 via a loading frame 14. To this end, the front wall 11 has a frame loop 15*a* on its top side. A front side of the loading frame 14 extends through the frame loop 15*a* of the front wall 11. A top side of the rear wall 12 is attached to a rear side of the loading frame 14 via a frame loop 15*b*. The front wall 11 and the rear wall 12 are thus attached to the suspension device 6 via the loading frame 14.

The closing device 4 has a front closing strip 16 and a rear closing strip 17. The closing device 4 has a main extent oriented parallel to a longitudinal axis 18 of the carrying device 1. The closing device 4 projects beyond the carrying wall 3 on both sides along the longitudinal axis 18. The underside of the front wall 11 is attached to the front closing strip 16. The underside of the rear wall 12 is attached to the rear closing strip 17. The carrying device 1 has a central plane 19 oriented vertically and parallel to the longitudinal axis 18.

In FIG. 1, the carrying device 1 is illustrated in a closed state 20. An underside of the front wall 11 is connected to an underside of the rear wall 12 via the closing device 4. The front closing strip 16 is to this end fastened to the rear closing strip 17 and the carrying wall 3 forwardly, rearwardly and downwardly delimits a carrying volume 21. The front closing strip 16 makes contact with the rear closing strip 17 in the region of the central plane 19. The front wall 11 and the rear wall 12 are formed from a textile material and are flexible. The goods 2 arranged in the carrying volume 21 are located on an underside of the carrying wall 3 on account of gravity. On account of the flexible, in particular pliable, configuration of the carrying wall 3, the latter adopts a shape corresponding to the shape of the goods 2. The goods 2 are thus retained tightly in the carrying volume 21.

The closing device 4 has a locking bolt 23 that is mounted in a rotatable manner about a bolt axis 22. The locking bolt 23 is attached to the front closing strip 16. The bolt axis 22 is oriented perpendicularly to the central plane 19. The locking bolt 23 extends substantially along the longitudinal axis 18. In the closed state 20, the locking bolt 23 is engaged with two bolt engagement means 24 of the closing device 4. The two bolt engagement means 24 are attached to the rear closing strip 17. The bolt engagement means 24 are at a spacing from one another along the longitudinal axis 18 and are arranged outside a lateral boundary of the carrying wall 3. The bolt engagement means 24 are in the form of elevations which engage in a recess in the front closing strip 16 in the closed state 20. In the closed state 20, the bolt engagement means 24 engages around the locking bolt 23 in a form-fitting manner.

The bolt engagement means 24 each have a bevel for reliable introduction into the respective recess in the front closing strip 16. The bolt engagement means 24 are in this case configured as centring means 25, in particular as centring pins. Via the bolt engagement means 24 and the recess, the front closing strip 16 is mounted so as to be displaceable perpendicularly to the central plane 19 relative to the rear closing strip 17. The bolt engagement means 24 are arranged in a manner offset through 180° with respect to one another relative to the bolt axis 22.

Arranged between the front closing strip 16 and the rear closing strip 17 are two spring means 26. The spring means 26 bring about an opening force, oriented perpendicularly to the central plane 19, between the front closing strip 16 and the rear closing strip 17.

The actuating device 5 comprises an actuating means 27 and a transmission means 28. The actuating device 5 is configured to release the connection between the front closing strip 16 and the rear closing strip 17 and thus between the front wall 11 and the rear wall 12 from the closed state 20.

The actuating means 27 is configured as an actuating lever. The actuating means 27 is mounted on the suspension device 6 so as to be rotatable about a lever axis 29 oriented parallel to the longitudinal axis 18.

The actuating means 27 is connected in a force-transmitting manner to an actuating mechanism 30. The actuating mechanism 30 is illustrated in detail in FIG. 7. To this end, the actuating mechanism 30 is configured to convert an actuating force $F_B$ oriented counter to the transport direction 13 into a transmission force $F_T$ oriented parallel to the longitudinal axis 18. The actuating mechanism 30 is connected in a force-transmitting manner to the transmission means 28.

The transmission means 28 is configured as a Bowden cable. The transmission means 28 extends between the actuating mechanism 30 and the closing device 4. A sheath of the Bowden cable is attached to a housing 31a of the actuating mechanism 30 and to a closing-strip connection 31b of the front closing strip 16. A core of the Bowden cable is attached to the actuating mechanism 30 and to a bolt connection 32 of the locking bolt 23. The bolt connection 32 is arranged at a spacing from the bolt axis 22 along the longitudinal axis 18. The transmission means 28 is attached to the closing device 4 such that the transmission force $F_T$ acts vertically upwardly on the bolt connection 32.

The front closing strip 16 comprises a closing spring 33. The closing spring 33 is connected in a force-transmitting manner to the bolt connection 32. The closing spring 33 brings about a closing-spring force $F_S$ acting on the bolt connection 32 downwardly in a vertical direction. The closing-spring force $F_S$ thus counteracts any movement of the locking bolt 23 out of the closed state 20.

Figure 6:
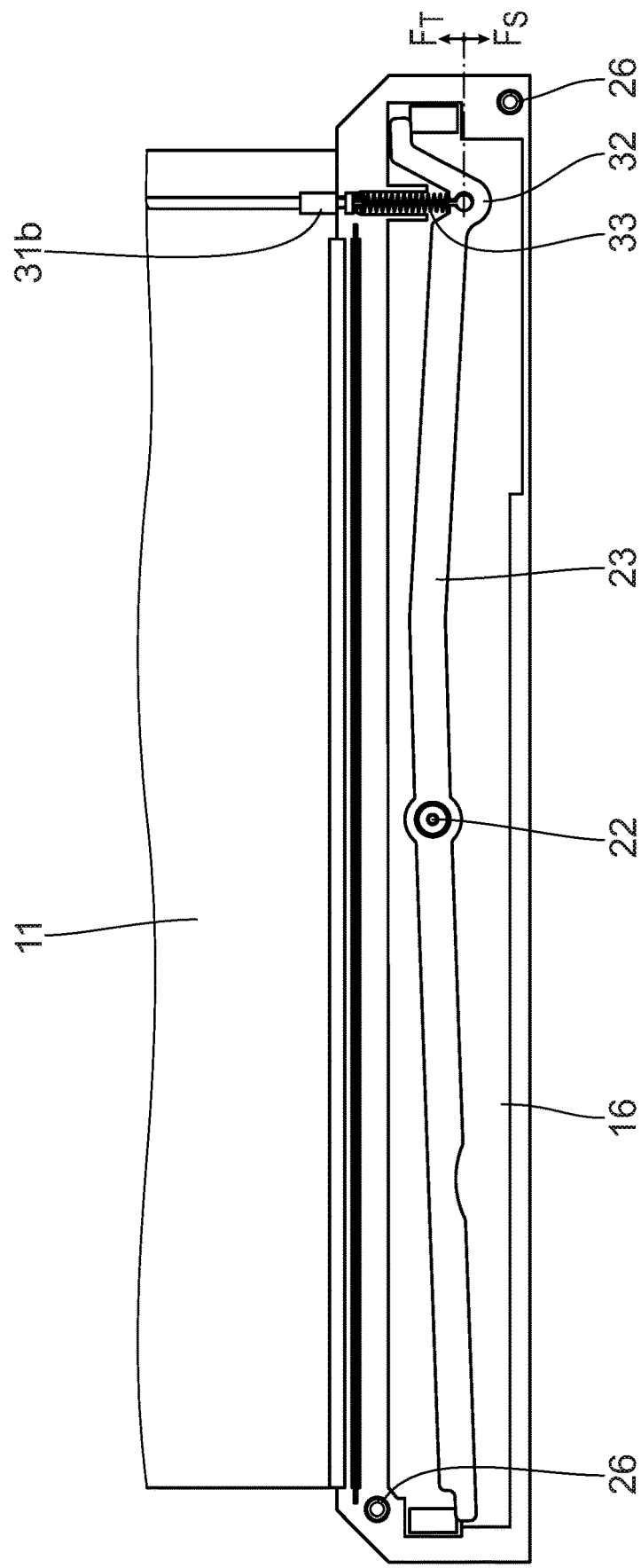
FIG. 6 shows a sectional illustration of the carrying device along the section line VI-VI in FIG. 2, wherein the carrying device is illustrated in an open state.
Figure 7:
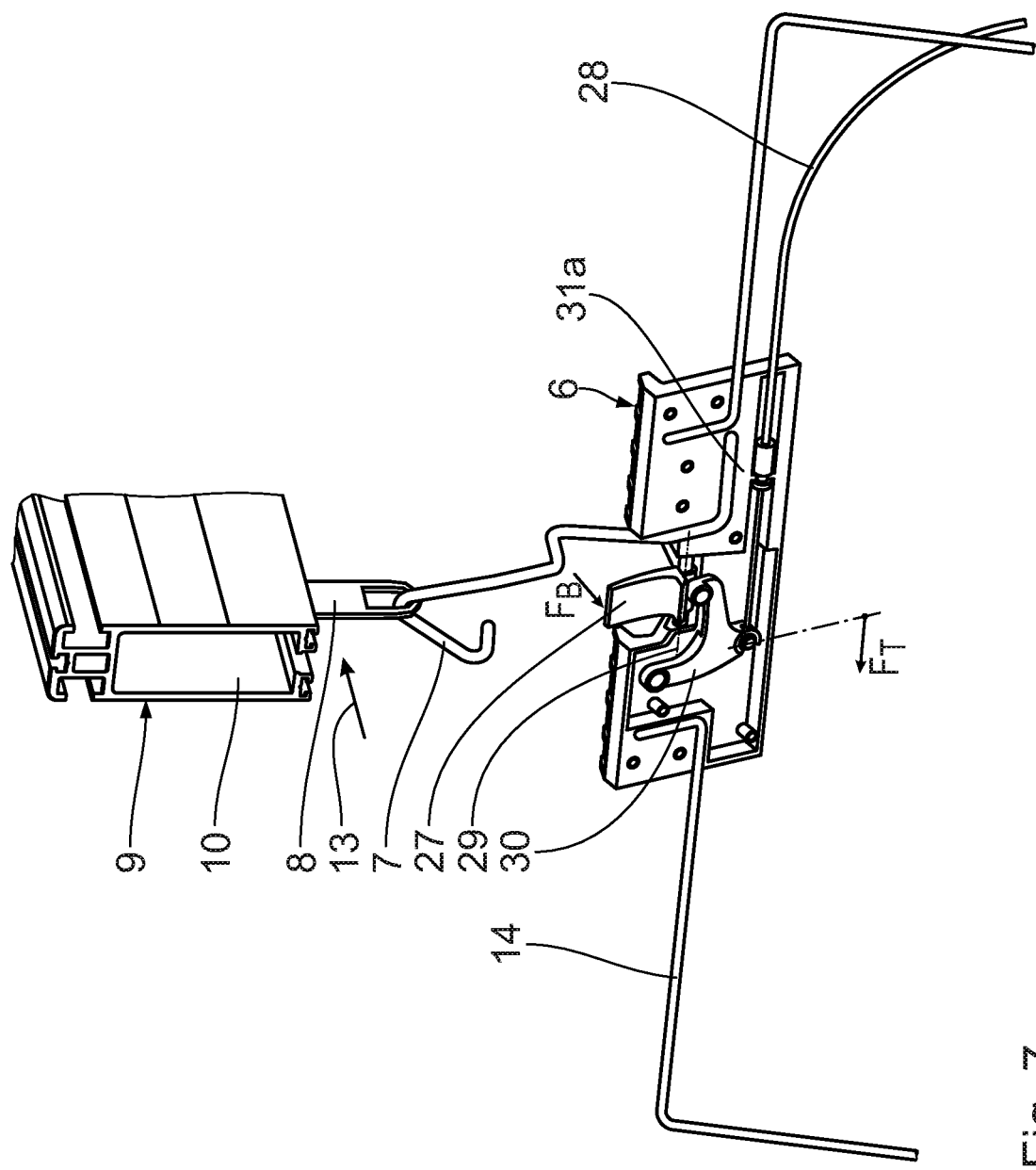
FIG. 7 shows a partially sectional detail illustration of a suspension device of the carrying device along a section line VII-VII in FIG. 3.
Figure 8:
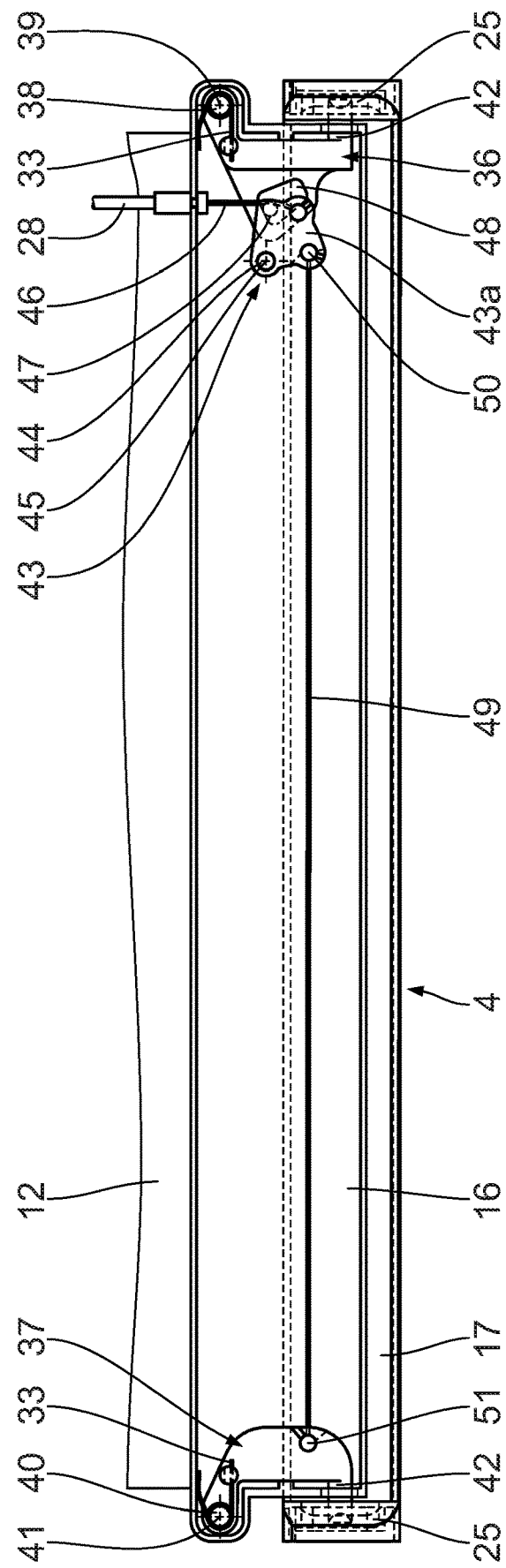
FIG. 8 shows a sectional illustration of a carrying device according to a further exemplary embodiment in a closed state, wherein the carrying device has a closing device with two locking bolts that are operatively connected to a transmission means and are movable relative to one another.

FIG. 6 illustrates the closing device 4 in an open state 34. The locking bolt 23 has been rotated about the bolt axis 22. The form-fitting connection between the locking bolt 23 and the two bolt engagement means 24 has been released. The front closing strip 16 and the rear closing strip 17 are movable with respect to one another along the central plane 19 and the connection between the front wall 11 and the rear wall 12 has been released.

The functional principle of the carrying device 1 for receiving the goods 2 is as follows:

The carrying device 1 is in the closed state 20. The locking bolt 23 engages in a form-fitting manner in the two bolt engagement means 24. The front closing strip 16 is firmly connected to the rear closing strip 17. The front wall 11 attached to the front closing strip 16 is firmly connected to the rear wall 12 attached to the rear closing strip 17. The carrying wall 3 forwardly, downwardly and rearwardly delimits the carrying volume 21. The spring means 26 is tensioned between the front closing strip 16 and the rear closing strip 17 and the closing spring 33 is relaxed.

As a result of the rail drive being actuated, the carrying device 1 is moved along the guide profile 10 in the direction of a loading station (not illustrated). In the loading station, the goods 2 are introduced into the carrying volume 21 via the loading frame 14. On account of the weight of the goods 2, the flexible carrying wall 3 is adapted to the shape of the goods 2. The goods 2 are tightly enclosed between the front wall 11 and the rear wall 12.

The carrying device 1 is moved along the guide profile 10 to an unloading station (not illustrated) by means of the rail drive.

In the unloading station, the actuating force $F_B$ acting counter to the transport direction 13 is exerted on the actuating means 27 by means of an actuating drive (not illustrated). The actuating means 27 is rotated about the lever axis 29. The actuating force $F_B$ is converted into the transmission force $F_T$ by the actuating mechanism 30 and the actuating mechanism 30 undergoes a rotation about an axis oriented parallel to the transport direction 13. The transmission means 28 transmits the transmission force $F_T$ from the actuating mechanism 30 to the bolt connection 32. As a result of the bolt connection 32 being raised upwardly in the vertical direction, the locking bolt 23 is rotated about the bolt axis 22. The locking bolt 23 is rotated about the bolt axis 22 until the latter is disengaged from the two bolt engagement means 24. The closing device 4 is in the open state 34.

The opening force provided by the spring means 26 causes the front closing strip 16 to move perpendicularly to the central plane 19 relative to the rear closing strip 17. The underside of the front wall 11 and the underside of the rear wall 12 are moved away from one another. The carrying wall 3 downwardly opens up the carrying volume 21 and is in the open state 34 illustrated in FIG. 2. The goods 2 drop downwardly out of the carrying device 1 on account of gravity. The actuating drive is disengaged from the actuating means 27.

The carrying device 1 is moved along the guide profile 10 to a closing station (not illustrated) by means of the rail drive.

The carrying device 1 is transferred back into the closed state 20 from the open state 34. To this end, the actuating drive is brought into engagement with the actuating means 27 and exerts the actuating force $F_B$ on the actuating means 27. As a result, the closing device 4 is moved back into the open state 34. The front closing strip 16 is moved in the direction of the rear closing strip 17 by means of a closing drive (not illustrated). The two bolt engagement means 24 pass into contact with the front closing strip 16. The bolt engagement means 24 act in the process as centring means 25 and guide the front closing strip 16 perpendicularly to the central plane 19 relative to the rear closing strip 17.

In FIGS. 8 to 11, a further exemplary embodiment of the carrying device 1 is described. In contrast to the preceding exemplary embodiment, the closing device 4 has two locking bolts 36, 37, which are movable relative to one another, for releasably connecting a front closing strip 16 to a rear closing strip 17. A first locking bolt 36 is mounted so as to be rotatable about a first bolt axis 39, in particular on a front closing strip 16, via a first pivot bearing 38. A second locking bolt 37 is mounted so as to be rotatable about a second bolt axis 41, in particular on the front closing strip 16, via a second pivot bearing 40. In order to form the first pivot bearing 38 and the second pivot bearing 40, the front closing strip 16 has two bearing pins. The first locking bolt 36 and the second locking bolt 37 each have a bearing bore. The locking bolts 36, 37 each have a bolt pin 42 for reversibly engaging in a bolt engagement means 24.

The closing device 4 has a coupling unit 43. The coupling unit 43 comprises a deflection means 43a. The locking bolts 36, 37 are operatively connected to the transmission means 28 via the deflection means 43a. The deflection means 43a is mounted so as to be rotatable about a deflection axis 45, in particular on the front closing strip 16, via a deflection bearing 44. In order to form the deflection bearing 44, the front closing strip 16 has a bearing pin. The deflection means 43a has a bearing bore.

The transmission means 28 is configured as a Bowden cable. A cable core 46 of the transmission means 28 is attached to the deflection means 43a. The transmission means 28 is connected to the deflection means 43a such that a transmission force $F_T$ has an effective axis at a spacing from the deflection axis 45.

The deflection means 43a has an actuating pin 47. The actuating pin 47 is engaged with an actuating cutout 48 in the first locking bolt 36. Via the actuating pin 47 and the actuating cutout 48, the deflection means 43a is connected to the first locking bolt 36 in a form-fitting manner.

The deflection means 43a is operatively connected to the second locking bolt 37 via a cable pull 49. The deflection means 43a has a deflection eye 50 for connecting to a cable nipple of the cable pull 49. The second locking bolt 37 has a bolt eye 51 for connecting to the cable pull 49. A cable axis 52 of the cable pull 49 is arranged at a spacing from the second bolt axis 41.

Figure 9:
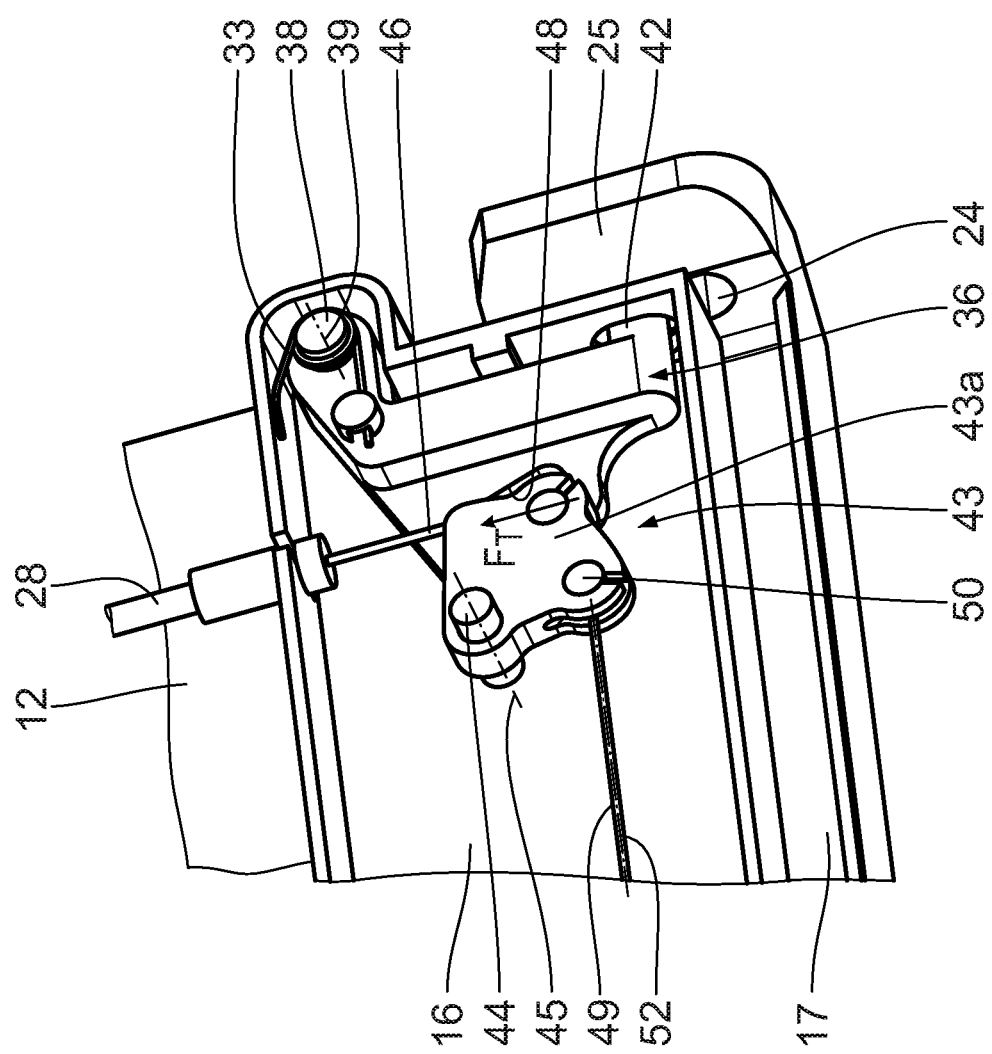
FIG. 9 shows a detail illustration of the closing device in FIG. 8, wherein the transmission means is connected to the locking bolts via a coupling unit.

In FIG. 9, the closing device 4 is illustrated in more detail. The closing device 4 has two closing springs 33. The closing springs 33 each act between the locking bolts 36, 37 and the front closing strip 16. The closing springs 33 bring about a force for moving the respective locking bolt 36, 37 from the open position into the closed position. The closing springs 33 are configured as torsion springs.

The closing device 4 comprises a centring means 25. The centring means 25 is arranged on the rear closing strip 17. The centring means 25 is configured as a bevel.

Figure 10:
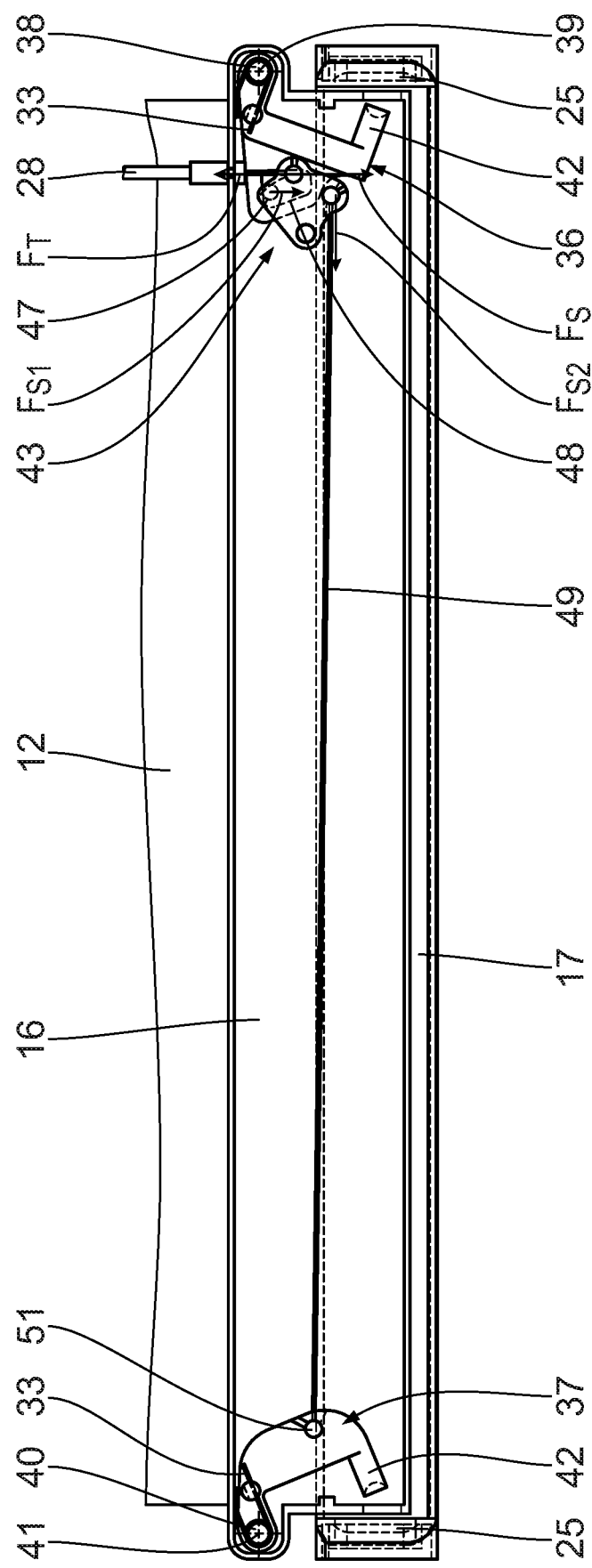
FIG. 10 shows a sectional illustration of the closing device in FIG. 8, wherein the closing device is illustrated in an open state.
Figure 11:
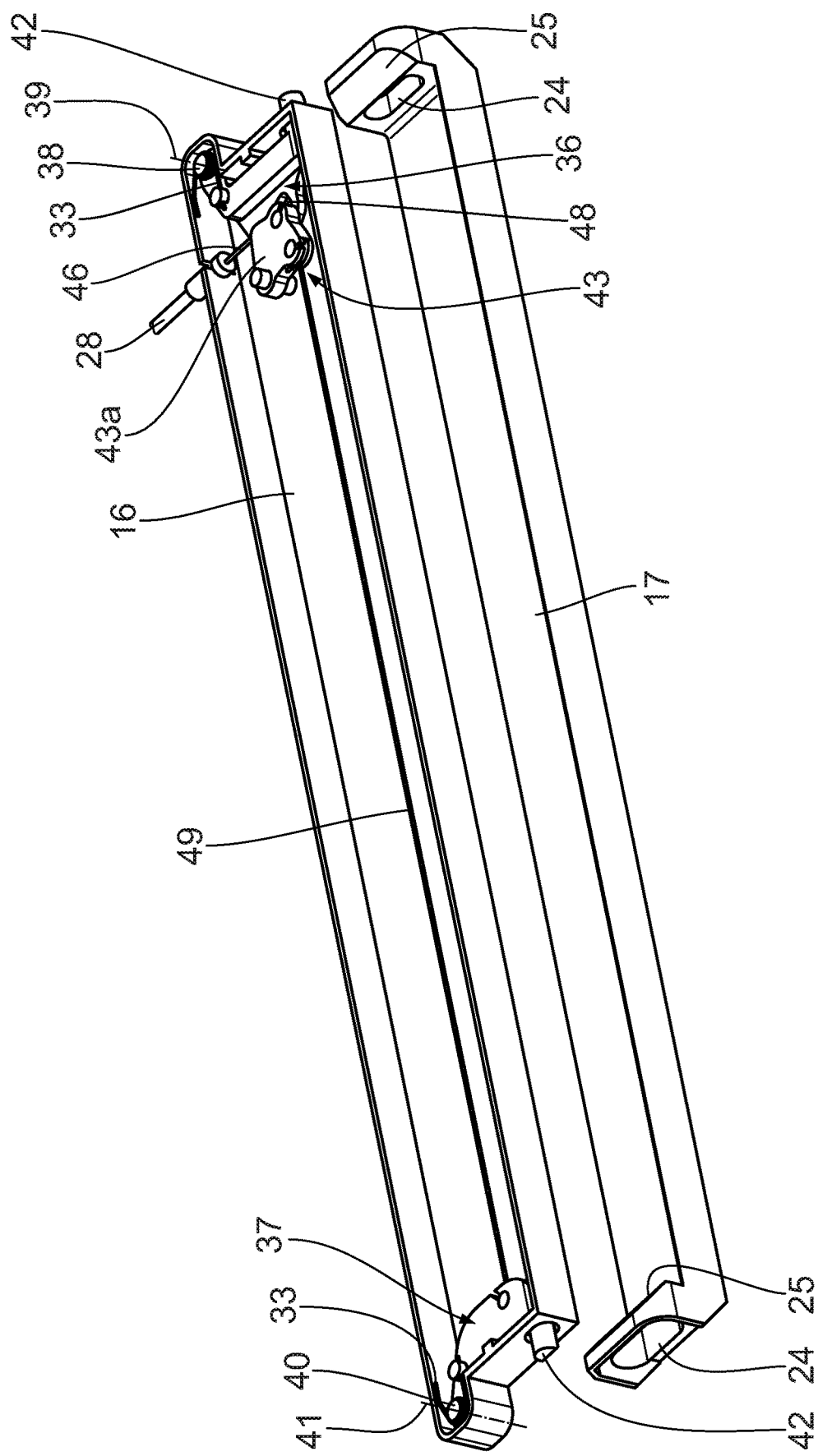
FIG. 11 shows a perspective illustration of the closing device in FIG. 8, wherein the closing device is arranged in the open state and wherein a front closing strip is arranged at a spacing from a rear closing strip.

In FIG. 10 and FIG. 11, the carrying device 1 is arranged in the open state. The connection between the front closing strip 16 and the rear closing strip 17 has been released. In FIG. 10, the locking bolts 36, 37 are arranged in the open position. In FIG. 11, the locking bolts 36, 37 are arranged in the closed position.

The functional principle of the carrying device 1 according to this exemplary embodiment corresponds to the functional principle of the carrying device 1 according to the preceding exemplary embodiment. The carrying device 1 is first of all in the closed state 20. In order to move the carrying device 1 into the open state 34, the actuating force $F_B$ is exerted on the actuating means 27. Via the cable core 46, the transmission force $F_T$ is transmitted to the deflection means 43a of the coupling unit 43. The deflection means 43a rotates about the deflection axis 45. Via the actuating pin 47 and the actuating cutout 48, the deflection means 43a causes the first locking bolt 36 to rotate about the first bolt axis 39. Via the cable pull 49, the deflection means 43a causes the second locking bolt 37 to rotate about the second bolt axis 41. The closing springs 33 act on the deflection means 43a via the locking bolts 36, 37. The closing-spring forces $F_{S1}$, $F_{S2}$ that counteract the transmission force $F_T$ act on the deflection means 43a.

The bolt pins 42 are disengaged from the respective bolt engagement means 24. The connection between the front closing strip 16 and the rear closing strip 17 is released. The carrying device 1 is in the open state 34.

In order to move the carrying device 1 from the open state 34 into the closed state 20, the front closing strip 16 can be guided up to the rear closing strip 17. The centring means 25 ensures that the locking bolts 36, 37 are moved from the closed position into the open position. The closing-spring forces $F_{S1}$, $F_{S2}$ are overcome in the process. The locking bolts 36, 37 latch together with the bolt engagement means 24 in a form-fitting manner. The carrying device 1 is in the closed state 20 again.

The carrying wall 3 is in the closed state 20 and the actuating drive is disengaged from the actuating means 27. The closing-spring force $F_S$ of the closing springs 33 causes the locking bolt 23 and the actuating device 5 to move into the closed state 20. The locking bolt 23 latches in undercuts 35 of the bolt engagement means 24. The locking spring 33 is relaxed and the spring means 26 is tensioned. The front wall 11 is connected to the rear wall 12 via the closing device 4, in particular via the form-fitting connection between the locking bolt 23 and the bolt engagement means 24.

The carrying device 1 is in the closed state 20 again. In order to receive the goods 2, the carrying device 1 can be moved back into the loading station.

The flexible configuration of the transmission means 28 ensures flexible adaptation of the carrying device 1 to the individual geometry of the goods 2 and allows a reduced-weight design. The goods 2 can thus be enclosed particularly tightly by the carrying wall 3 and be retained captively in the carrying volume 21. The carrying device 1 thus ensures particularly robust, reliable and economical transport of the goods 2.

What is claimed is:

1. A carrying device for receiving goods, the carrying device comprising:
    a carrying wall having a front wall and a rear wall, the carrying wall being arrangeable between a closed state and an open state, the carrying wall delimiting a carrying volume for receiving the goods to a front, to a bottom and to a rear at least partially in the closed state, and the carrying wall downwardly opening up the carrying volume in the open state;
    a closing device for releasably connecting the front wall to the rear wall in the closed state; and
    an actuating device, connected to the closing device, for releasing the connection between the front wall and the rear wall from the closed state, the actuating device having an actuating means arranged at a spacing from the closing device and the actuating device having a transmission means acting between the actuating device and the closing device, wherein the transmission means establishes a force-transmitting connection between the actuating means and the closing device, the transmission means being formed in a flexible manner.

2. The carrying device according to claim 1, wherein the transmission means is formed in a pliable manner.

3. The carrying device according to claim 1, wherein the transmission means has at least one of the group comprising a Bowden cable and a hydraulic line.

4. The carrying device according to claim 1, wherein the transmission means is arranged at least sectionally in front of the front wall, wherein the front wall is formed at least regionally in a flexible manner.

5. The carrying device according to claim 1, wherein the closing device has a front closing strip and a rear closing strip, wherein the front closing strip and the rear closing strip are fastened together in a releasable manner to connect the front wall to the rear wall in the closed state.

6. The carrying device according to claim 5, wherein the front closing strip is attached to the front wall, and wherein the rear closing strip is attached to the rear wall.

7. The carrying device according to claim 5, wherein, in order to be moved out of the closed state, the front closing strip and the rear closing strip are mounted against one another so as to be displaceable obliquely with respect to a longitudinal axis of the carrying device.

8. The carrying device according to claim 5, wherein the closing device has a spring means, acting between the front closing strip and the rear closing strip, for supporting the movement from the closed state into the open state.

9. The carrying device according to claim 5, wherein the closing device has a centering means for moving the front closing strip into the closed state in a guided manner relative to the rear closing strip.

10. The carrying device according to claim 1, wherein the closing device has at least one locking bolt that is mounted so as to be rotatable about a bolt axis.

11. The carrying device according to claim 10, wherein the closing device has at least two of the locking bolts, which are movable relative to one another.

12. The carrying device according to claim 11, wherein the closing device has a coupling unit, acting between the at least two locking bolts, for the kinematic coupling of a movement of the at least two locking bolts.

13. The carrying device according to claim 10, wherein the closing device has at least two bolt engagement means for the engagement of the locking bolt in the closed state.

14. The carrying device according to claim 13, wherein the at least two bolt engagement means are arranged in a manner offset through at least 120° with respect to one another relative to the bolt axis.

15. The carrying device according to claim 1, further comprising a suspension device, attached to the carrying wall, for suspending the carrying device, wherein the actuating means is attached to the suspension device.

16. The carrying device according to claim 1, wherein at least a portion of the transmission means is adjacent to the carrying wall.

17. A carrying device for receiving goods, the carrying device comprising:
- a carrying wall having a front wall and a rear wall, the carrying wall being arrangeable between a closed state and an open state, the carrying wall delimiting a carrying volume for receiving the goods to a front, to a bottom and to a rear at least partially in the closed state, and the carrying wall downwardly opening up the carrying volume in the open state;
- a closing device for releasably connecting the front wall to the rear wall in the closed state; and
- an actuating device, connected to the closing device, for releasing the connection between the front wall and the rear wall from the closed state, the actuating device having an actuating means arranged at a spacing from the closing device and the actuating device having a transmission means acting between the actuating device and the closing device, wherein the transmission means is formed in a flexible manner, wherein the closing device has a front closing strip and a rear closing strip, wherein the front closing strip and the rear closing strip are fastened together in a releasable manner to connect the front wall to the rear wall in the closed state, and wherein the front closing strip and the rear closing strip have a longitudinal extent which corresponds to at least 50% of a longitudinal extent of the carrying wall.

18. A carrying device for receiving goods, the carrying device comprising:
- a carrying wall comprising a front wall and a rear wall, the carrying wall being configured to form a closed configuration and an open configuration, the closed configuration of the carrying wall defining a carrying volume for receiving the goods, the open configuration of the carrying wall defining an opening in a bottom area of the carrying wall;
- a closing device configured to detachably connect the front wall to the rear wall; and
- an actuating device connected to the closing device, the actuating device being configured to release a connection between the front wall and the rear wall, the actuating device comprising an actuating means arranged at a spaced location from the closing device, the actuating device further comprising a transmission structure defining at least a portion of a force transmission path between the actuating device and the closing device, wherein the force transmission path is configured to transmit a force from the actuating means to the closing device.

19. The carrying device according to claim 18, wherein at least a portion of the transmission means is adjacent to the carrying wall.

20. The carrying device according to claim 19, wherein the transmission structure is formed in a flexible manner.

* * * * *